(12) United States Patent
Kanai (10) Patent No.: US 6,498,902 B2
(45) Date of Patent: Dec. 24, 2002

(54) INDICATION OPTICAL SYSTEM WITHIN FINDER

(75) Inventor: Moriyasu Kanai, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/790,575

(22) Filed: Feb. 23, 2001

(65) Prior Publication Data

US 2001/0022894 A1 Sep. 20, 2001

(30) Foreign Application Priority Data

Feb. 24, 2000 (JP) .................................. 2000-047468

(51) Int. Cl.$^7$ ............................................ G03B 17/20
(52) U.S. Cl. ...................................................... 396/296
(58) Field of Search ........................................ 396/296

(56) References Cited

U.S. PATENT DOCUMENTS

| | | | |
|---|---|---|---|
| 5,839,007 A | 11/1998 | Kawakami | 396/296 |
| 5,913,087 A | 6/1999 | Hirai | 396/296 |
| 6,104,884 A | 8/2000 | Abe | 396/296 |
| 6,130,995 A | 10/2000 | Abe et al. | 396/296 |

*Primary Examiner*—W. B. Perkey
(74) *Attorney, Agent, or Firm*—Greenblum & Bernstein, P.L.C.

(57) ABSTRACT

A finder indication optical system, in which an indication device is provided, includes a correction surface provided in the finder indication optical system to correct an astigmatic difference thereof. The origin of the correction surface is defined on the optical axis; the optical axis defines an X-axis; the transverse direction of the correction surface, perpendicular to the X-axis, defines a Y-axis; the longitudinal direction of the correction surface, perpendicular to the X-axis, defines a Z-axis; the coordinates of the center of the correction surface are $(\alpha,\beta)$; and the absolute value of curvature C in a section parallel with a X-Z plane, at the coordinates (y, z) of the correction surface, is $|CZ(y, z)|$. The correction surface is formed so that the absolute value $|CZ(y, z)|$ of the curvature C increases as the absolute value of z at $y=\alpha$ increases.

9 Claims, 5 Drawing Sheets

—— d Line
······ g Line
- - - C Line

-1.0  1.0
SPHERICAL
ABERRATION

CHROMATIC
ABERRATION

Fig.4B
B=15.8

-0.1  0.1
LATERAL
CHROMATIC
ABERRATION

Fig.4C
B=15.8

—— Sag
- - M

-2.0  2.0
ASTIGMATISM

Fig.4D
B=15.8

-5.0 (%) 5.0
DISTORTION

INDICATION OPTICAL SYSTEM WITHIN FINDER

BACKGROUND OF THE INVENTION

1. Field of the Invention

The present invention relates to a finder indication optical system which can be advantageously used for an indicator within a finder of a camera, and in particular a small camera, such as a digital camera.

2. Description of the Related Art

In a view finder of a conventional camera, in particular a single lens reflex camera, an indication device is provided in the vicinity of an image surface (focusing screen) of an objective optical system (photographing lens) or provided in a position optically equivalent to the image surface, so that together with an object image formed by the objective optical system, the indication of the indication device can be viewed outside of the photographing area which defines the periphery of a picture to be exposed on a film.

In a view finder of a single lens reflex digital camera or a real-image type view finder of a compact camera in which the image of the objective optical system is smaller than that in a single lens reflex camera using a silver-halide film, an eyepiece (eyepiece optical system) provided within the finder optical system to view an object image formed by the objective optical system is small and has a large magnification. However, the number of the lenses of the eyepiece is decreased in order to reduce the manufacturing cost, and consequently it is difficult to maintain a good image peripheral portion of the field of view. Nevertheless, if the object image formed by the objective optical system is viewed through the eyepiece, the deterioration of the image quality peripheral portion of the is not serious because, normally, a viewer tends not to focus on the peripheral portion of the photographing area. However, in the indication within the finder in which only the peripheral portion of the field of view is utilized, if an indication of high contrast is viewed, deterioration of a finder indication image in the meridional direction or sagittal direction due to aberration and, in particular, astigmatic difference is apparent.

SUMMARY OF THE INVENTION

In order to solve the above-mentioned problem of the prior art, it is an object of the present invention to provide an optical system in which an astigmatic difference correction device is provided in a light path of a finder indication optical system to reduce or eliminate distortion of a finder indication image, so that an image of high quality can be viewed within the finder.

To achieve the object, according to the present invention, a finder indication optical system is provided, in which an indication device is provided in the vicinity of an image surface of an objective optical system or provided in a position in which the diopter is substantially equivalent to the image surface of the objective optical system when viewed through a finder field of view of a finder optical system, so that photographing information formed by the indication device can be viewed outside of the photographing area which is formed to be seen in the finder field of view, said indication optical system comprising: a correction surface which is provided along a light path of the finder indication optical system to correct an astigmatic difference thereof, wherein the correction surface is provided at a predetermined position from the optical axis of the finder optical system as the origin point, and wherein the correction surface is formed in the following manner:

the optical axis defines an X-axis;

the direction parallel to the transverse direction of said correction surface and perpendicular to the X-axis, defines a Y-axis;

the direction parallel to the longitudinal direction of said correction surface and perpendicular to the X-axis, defines a Z-axis;

the coordinates of the center of said correction surface are $(\alpha, \beta)$; and the absolute value of curvature C in a section parallel with a plane defined by said X-axis and said Z-axis, at the coordinates (y, z) of the correction surface, is $|Cz(y, z)|$;

wherein said correction surface is formed so that the absolute value $|CZ(y, z)|$ of the curvature C increases as the absolute value of z at y=α increases. Preferably, the absolute value $|CY(y, z)|$ of the curvature C in a section parallel with a plane defined by the X-axis and the Y-axis, at the coordinates (y, z) of the correction surface, satisfies the following condition (1) at y=α and z=β:

$$|CY(y, z)|/|CZ(y, z)| \geq 1 \qquad (1)$$

Preferably, the following condition (2) is satisfied:

$$S/fr < 0.5 \qquad (2);$$

wherein fr designates the combined focal length of the optical system which constitutes the finder optical system provided optically behind the correction surface; and S designates the reduced spatial distance between a indication surface of the indication device and the correction surface.

Preferably, the following condition (3) is satisfied:

$$0.1 < S/fr \qquad (3).$$

In an embodiment, the finder indication optical system includes a prism, wherein the correction surface is formed on at least one of an incidence surface, a reflection surface and an emission surface, of the prism.

In an embodiment, the correction surface is defined by a part of a rotationally symmetric aspherical surface whose rotational axis is to the same as the optical axis of the finder optical system.

In an embodiment, the finder indication optical system includes a real-image finder in which an object image formed by a photographing lens on a primary imaging plane is formed and viewed on a secondary imaging plane through a condenser lens, a relay lens system, and an eyepiece lens system.

In an embodiment, an indicator is further provided, which is located in the vicinity of the primary imaging plane and outside of the light path of the finder optical system, so that the indication surface thereof is located at a position optically equivalent to the primary imaging plane, wherein the prism is provided between the primary imaging plane and the condenser lens, and in the vicinity of the upper portion of the primary imaging plane.

The present disclosure relates to subject matter contained in Japanese Patent Application No.2000-47468 (filed on Feb. 24, 2000) which is expressly incorporated herein by reference in its entirety.

BRIEF DESCRIPTION OF THE DRAWINGS

The invention will be discussed below in detail with reference to the accompanying drawings in which.

DESCRIPTION OF THE PREFERRED EMBODIMENTS

Figure 1:
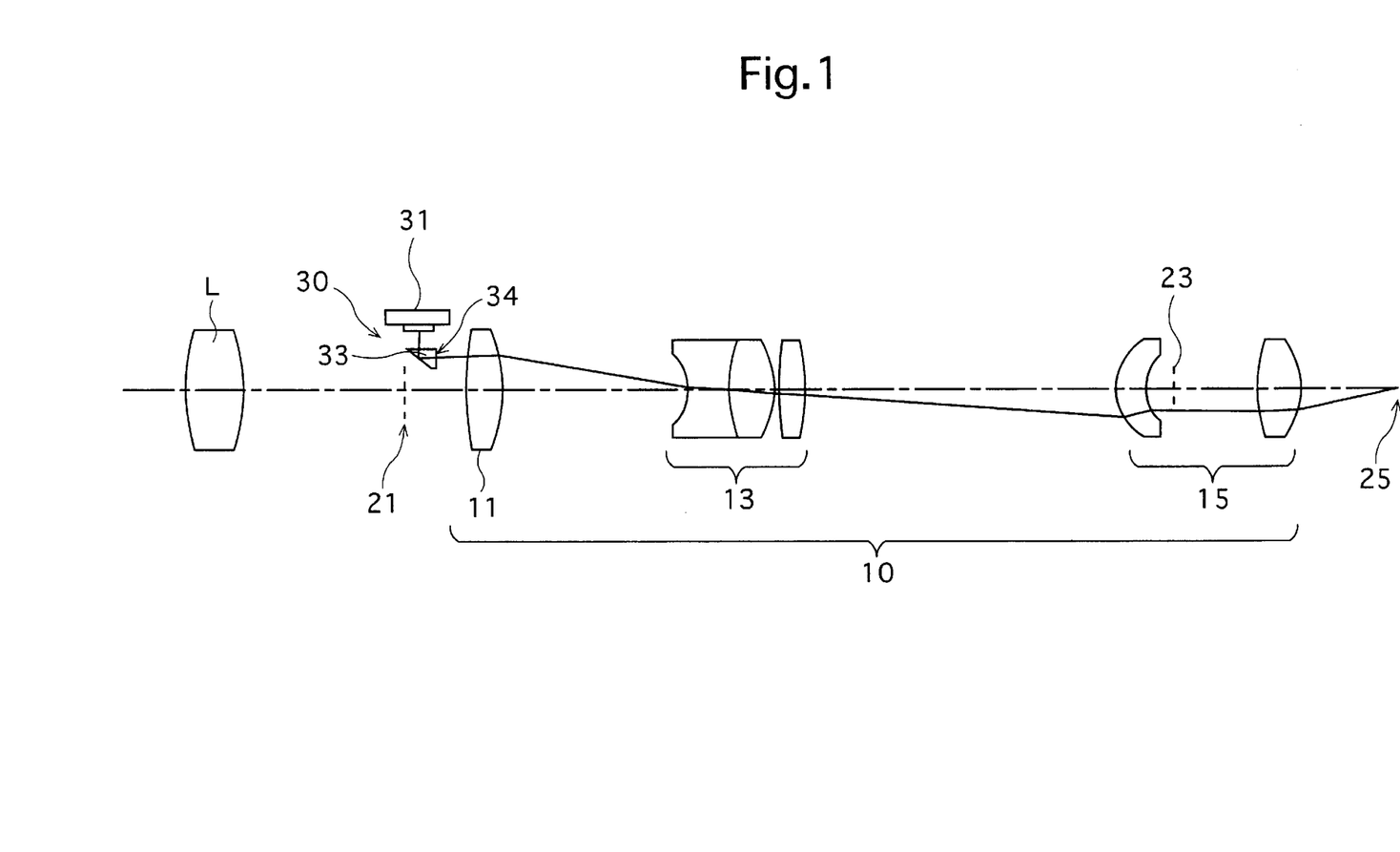
FIG. 1 is a conceptual view of a lens arrangement of a finder optical system having a finder indication optical system, according to a first embodiment of the present invention.

In FIG. 1 which shows an embodiment of a lens arrangement of a real-image finder to which a finder indication optical system according to the present invention is applied. A finder optical system 10 is a real-image finder in which an object image formed by an objective optical system (photographing lens L) on a primary imaging plane 21 is formed and viewed on a secondary imaging plane 23 through a condenser lens 11, a relay lens system 13 and an eyepiece lens system 15. In the finder optical system 10, an eye point is formed at a position 25.

Figure 2:
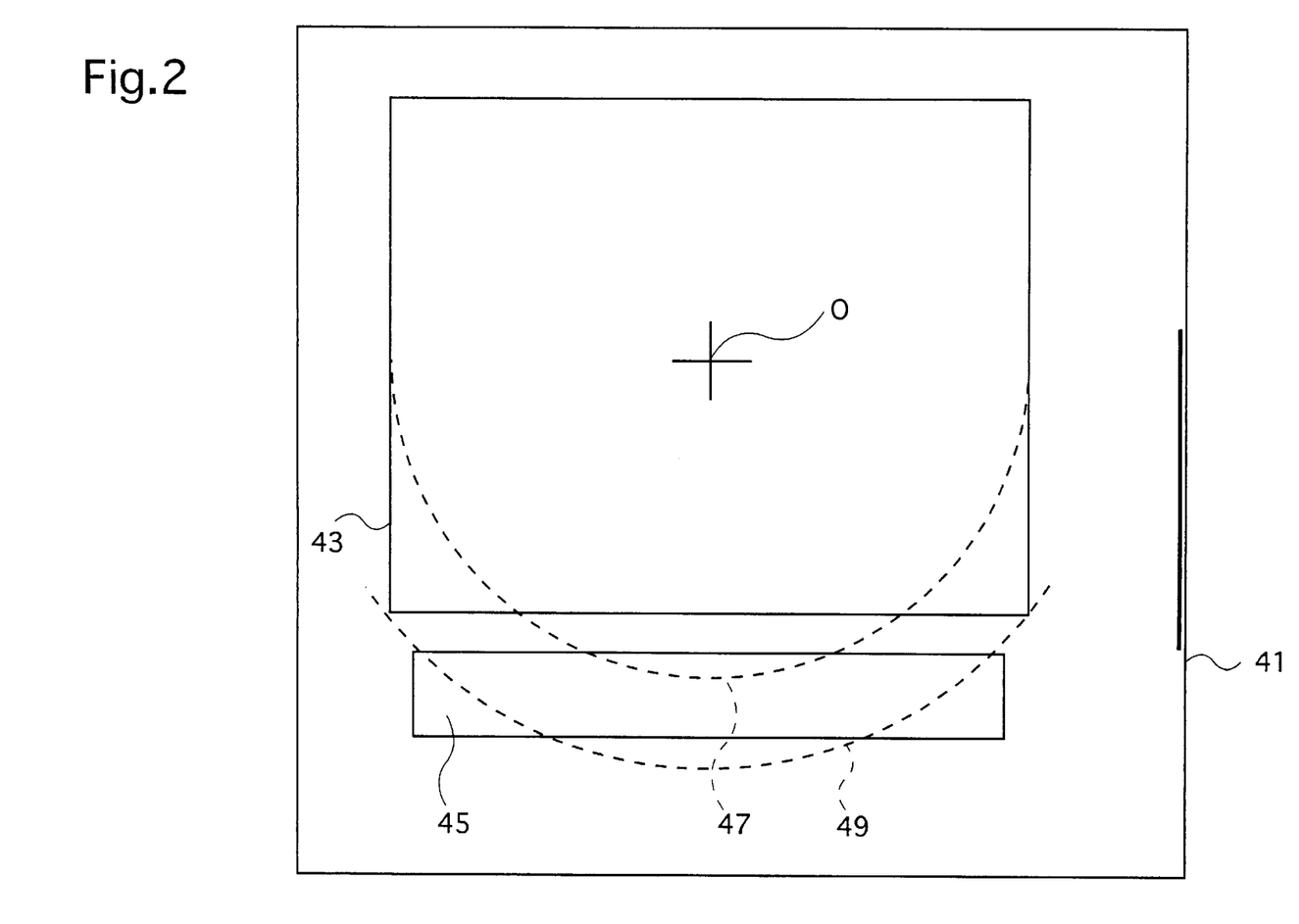
FIG. 2 is a schematic view of a finder field of view of a finder optical system and a finder indication optical system, according to the present invention.
Figure 3:
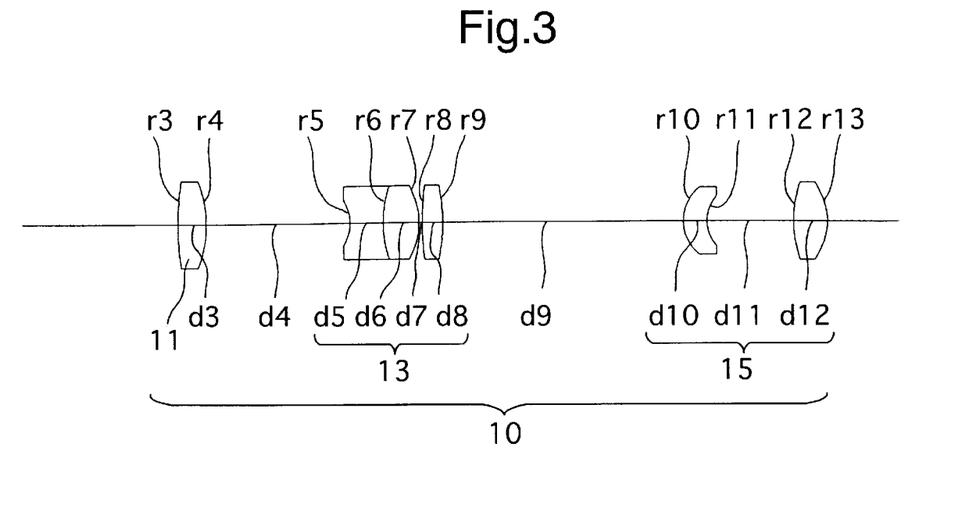
FIG. 3 is a conceptual view of a lens arrangement of a finder optical system with the finder indication optical system omitted for clarity.
Figures 4A, 4B, 4C:
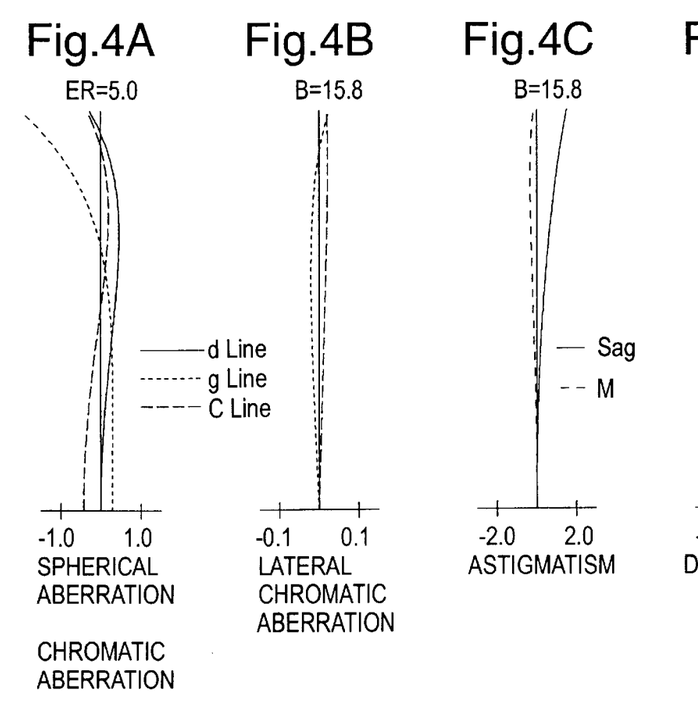
FIGS. 4A, 4B, 4C and 4D show aberration diagrams of a finder optical system according to the present invention.
Figure 4D:
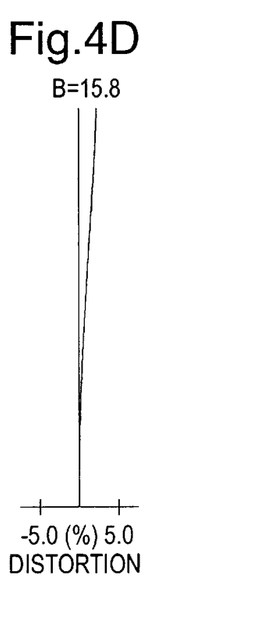
Figure 5:
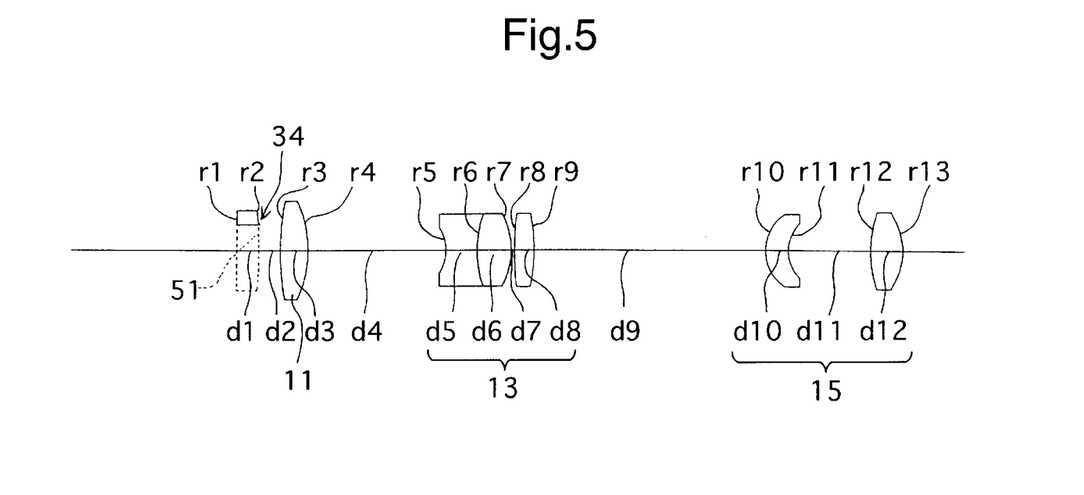
FIG. 5 is a conceptual view of a lens arrangement of the finder optical system and the indication optical system in which a rotationally symmetric aspherical surface is used as a correction surface.

A finder indication optical system 30 includes an indicator (indication device) 31 which is located in the vicinity of the primary imaging plane 21 and outside of the light path of the finder optical system 10, so that the indication surface thereof is located at a position optically equivalent to the primary imaging plane 21, and a prism 33 which is provided between the primary imaging plane 21 and the condenser lens 11 and in the vicinity of the primary imaging plane 21. The indicator 31 is provided with a group of indication elements, for example, a light emitting diode array which indicates photographing information such as a shutter speed, etc. Indication light emitted from the indication element group is reflected by the prism 33, located in the light path of the finder optical system 10, along the light path of the finder optical system 10, so that an indication within the finder, such as the shutter speed, is formed in the finder indication frame 45 positioned below the photographing area 43 which defines the periphery of a picture to be exposed on a film, as shown in FIG. 2. Also, in FIG. 2, around the photographing area 43, the finder field of view 41 which defines the periphery of a view can be seen through the finder optical system is formed.

The eyepiece of a real-image finder used in a conventional compact camera is usually made of a single lens element or two lens elements at most. In many cases, the finder optical system for a single lens reflex digital camera includes an eyepiece made of one through three lens elements and a relay-lens type image erection system. If the eyepiece is made of a small number of lens elements to reduce the manufacturing cost, it is very difficult to correct the Petzval sum, thus resulting in an increased curvature of field. In general, an astigmatic difference is produced to make the average image surface as flat as possible. In this solution, the curvature of the field in the sagittal direction is enhanced in the peripheral portion of the finder field of view due to the astigmatic difference, so that the finder indication image is deteriorated.

In an arrangement of the present invention, major deterioration of the image occurs between an arc 47, of a small diameter circle whose center is located on the center of the photographing area 43 (i.e., the optical axis O of the finder optical system 10) and is inscribed with the longitudinal sides of the photographing area 43, and an arc 49 of a circle which is concentric to the circle which defines the arc 47 and passes the four corners of the photographing area 43. Nevertheless, in case of a rectangular photographing area 43, deterioration of an object image partly takes place only at the vicinity of the corner portions of the photographing area 43 and accordingly is negligible upon viewing the object image.

However, since the finder indication frame 45 is defined by a portion (limited area for the image whose image height is high) located outside of the photographing area 43, the astigmatic difference has a serious influence over the entire finder indication frame 45, and consequently, the deterioration of the finder indication image in the meridional or sagittal direction makes it difficult to read the indicated information correctly. Moreover, the characters or symbols are made visible by the contrast of the characters or symbols themselves, and thus the influence by the astigmatic difference tends to be more serious.

If significance is placed on the indication within a finder, which employs the peripheral portion of the field of view only, it is preferable that the astigmatic difference be as small as possible even if the curvature of the field is increased. Namely, even if the curvature of the field is increased, the difference of the image curvature within the finder indication frame is small and accordingly the indication is not greatly influenced thereby. Furthermore, the tolerable range of the curvature of field is, in general, greater than the tolerable range of the astigmatic difference, due to the diopter correction power of the human eye.

A correction surface to correct the astigmatic difference is provided in the light path of the finder indication optical system 30, so that the aberration balance suitable to view the object image formed by the objective optical system is replaced with the aberration balance suitable to view the indication within a finder, whereby a good indication can be obtained. Since only the finder indication optical system requires correction, the correction surface may be provided only at the portion in which the light for the indication passes. In the embodiment shown in FIG. 1, the emission surface of the prism 33 provided in the light path of the finder indication optical system 30 defines the correction surface 34.

Figure 7A:
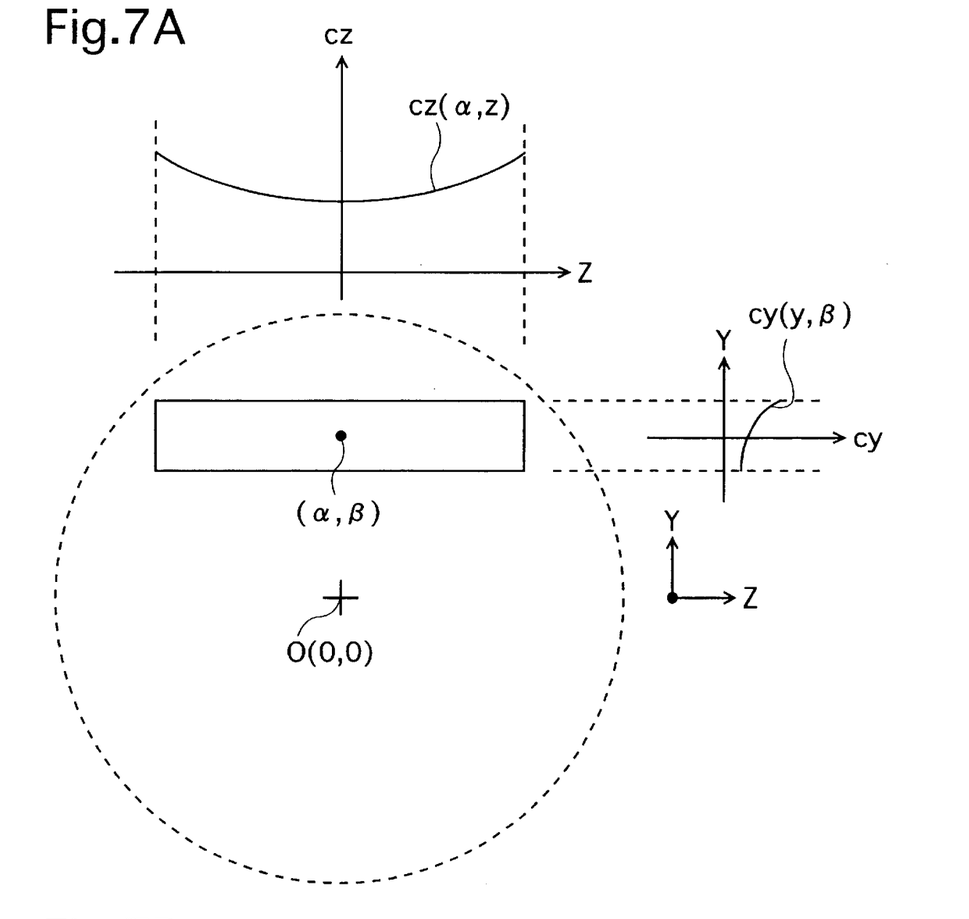
FIGS. 7A and 7B show a schematic view of the shape of a lens, and graph of the curvature thereof, respectively, in a finder indication optical system in which a rotationally symmetric aspherical surface is used as a correction surface, according to the present invention.

FIG. 7A shows the optical axis O of the finder optical system and the correction surface 34 in a developed state of the reflection surface of the prism 33, in the real-image finder shown in FIG. 1. As can be seen in FIG. 7A, assuming that the optical axis O is the origin (0, 0); the travel direction of the light is X (parallel with the optical axis O); the direction parallel to the transverse direction of the correction surface and perpendicular to the X-axis is Y; the direction parallel to the longitudinal direction of the correction surface and perpendicular to the X-axis is Z; and the coordinates of the center of the correction surface 34 are ($\alpha$, $\beta$), the correction surface 34 is formed such that the absolute value |CZ (y, z)| of the curvature C in a section parallel with the X-Z plane at the coordinates (y, z) of the correction surface increases as the absolute value of z increases at least at y=$\alpha$.

It is well known that, in general, a surface located in the vicinity of an object surface or imaging plane has great influence on astigmatism or distortion, but has little influence on spherical aberration or comatic aberration. Furthermore, this property of the surface can be enhanced by forming such a surface as ahn asperical surface. It has been found that owing to the above-mentioned properties, if the correction surface is provided in the vicinity of the object surface of the eyepiece lens system of the finder optical system (primary imaging plane or secondary imaging plane) having an aberration balance suitable to view the image of the objective optical system, an aberration balance suitable to view the indication within the finder can be obtained without varying the comatic aberration.

In the embodiment, the correction surface 34 is formed as a part of the rotationally symmetric aspherical surface 51 which is rotationally symmetrical with respect to the optical axis O of the finder optical system. With this arrangement, the absolute value of the curvature of the correction surface 34 in the longitudinal direction (i.e., curvature CZ in a section parallel with the X-Z plane) increases toward the peripheral portion of the correction surface in the longitudinal direction.

Figure 7B:
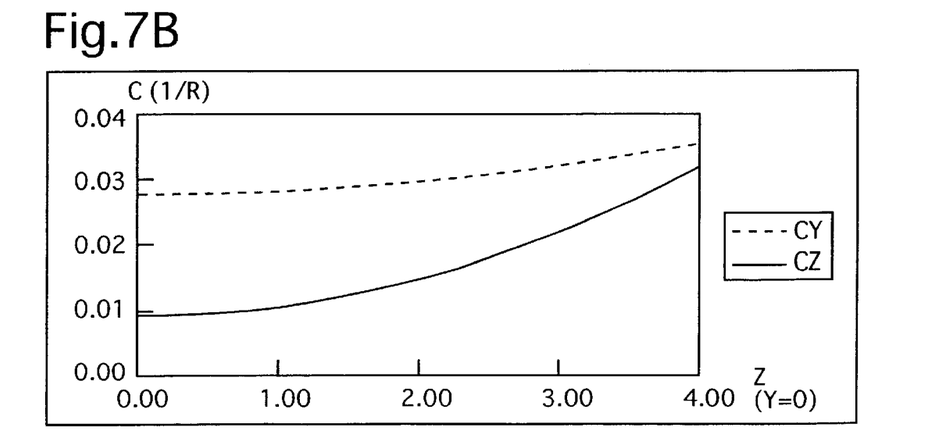

In the embodiment, in order to maintain distortion at a small amount, it is preferable that the following condition (1) be satisfied:

$$(CY\ (y,\ z)|/|CZ\ (y,\ z)|\geq 1 \qquad (1);$$

wherein y =$\alpha$, and z=$\beta$, and |CY (y,z)| represents the absolute value of curvature C at the point (y,z) on the correction surface 34 in a section parallel with the X-Y plane. FIG. 7B is a graph illustrating the relationship between CY and CZ.

If the value of |CZ (y, z)| at the center of the correction surface is set small, the curvature CZ at the peripheral portion of the correction surface in the longitudinal direction can be maintained small, and thereby the distortion can be reduced. Note that, even if the distortion is made relatively large, it is possible to reduce the influence of distortion by deforming the shape of the indication itself in advance, corresponding to the distortion, so as to cancel the distortion.

In the present invention, it is preferable that the position in which the correction surface 34 is provided is determined to satisfy the following condition (2):

$$S/fr<0.5 \qquad (2);$$

wherein fr represents the combined focal length of the finder optical system (i.e., the optical system provided behind the correction surface 34) including the condenser lens 11, the relay lens system 13 and the eyepiece lens system 15; and S represents the reduced spatial distance between the indication surface of the indicator 31 and the correction surface 34. Being behind indicates the light-rays emission side in the optical system. Note that the distance S refers to a distance from the center point of the correction surface 34, in a direction parallel with the optical axis of the finder optical system in a developed state of the light path when the finder indication optical system includes a reflection surface.

The correction surface 34 having an aberration conversion function corrects the astigmatism of the eyepiece lens system 15 of the finder optical system. The distance between the object surface of the finder optical system 10 and the correction surface 34 has a close relationship with the influence of the various aberrations. Namely, the correction surface 34 is preferably located as close as possible to a position in which coma aberration is little varied and astigmatism has a great influence.

Since the diopter of the object image and the image of the indication within the finder, viewed through the finder optical system 10, is set approximately in the range of 0 to −1 Dptr, the object surface may be located near the front focus point of the finder optical system 10. Moreover, the indication surface of the indicator 31 is located at a position optically equivalent to the object surface of the finder optical system. Note that condition (2) specifies the distance S standardized by the focal length fr of the finder optical system. Here, the distance S indicates a length from the indication surface of the indicator 31 to the correction surface 34 which is formed as a part of the rotationally symmetric aspherical surface. Therefore, if the reduced spatial distance S is more than the upper limit specified in condition (2), it is impossible to reduce the astigmatism, and the comatic aberration varies considerably.

To restrict the distortion, it is preferable that the following condition (3) be satisfied:

$$0.1<S/fr \qquad (3)$$

If S is smaller than the lower limit of condition (3), the deformation of the characters or symbols due to distortion becomes too large. In an indication device in which characters or symbols are indicated by liquid crystal, if an attempt is made to cancel distortion by deforming the liquid crystal, the amount of change in the liquid crystal becomes too large, so that the indication device has to be made larger.

The image formed by the objective lens of the real-image finder of a compact camera or the finder of a digital camera is smaller than that in a single lens reflex camera using a silver-halide film, and hence, it is difficult to arrange the indication system such as a liquid crystal display having a large substrate in parallel with the field frame. Consequently, in most cases, the light path is bent by the prism, or the like, to prevent interference with the field frame. To this end, the emission surface of the prism 33 to bend the light path defines the correction surface 34. Note that the correction surface 34 can be defined by the incident surface or reflection surface of the prism 33. Alternatively, it is also possible to form the correction surface 34 on an optical element separate from the prism 33.

Numerical example of the invention will be discussed below. In Table land the drawings, R designates the radius of curvature, D designates the thickness of the lens or distance between the lenses, Nd designates the refractive index of the d-line, and v designates the Abbe number. In the aberration diagrams, ER designates the diameter of the exit pupil (mm), B designates the angle (°) of the exit light rays with respect to the optical axis O, d-line, g-line and c-line represent the chromatic aberration represented by spherical aberration and lateral chromatic aberration at the respective wavelengths, Sag represents the Sagittal image and M represents the Meridional image.

The rotationally symmetric aspherical surface is defined as:

$$x = cy^2/(1+[1-\{1+k\}c^2y^2]^{1/2}) + A4y^4 + A6y^6 + A8y^8 + A10y^{10} + A12y^{12}\ldots$$

wherein 'c' designates the curvature (1/r), 'y' designates the height from the optical axis, 'k' designates a conic coefficient, and A4, A6, A8, A10, etc., designate aspherical coefficients.

In Table 1, surface Nos. 1 and 2 correspond to the finder indication optical system 30, surface Nos. 3 through 13 correspond to the finder optical system 10. Namely, surface Nos. 1 and 2 represent the surfaces of the prism 33, surface Nos. 3 and 4 represent the surfaces of the condenser lens 11, surface Nos. 5 through 9 represent the surfaces of the relay lens 12, surface Nos. 10 through 13 represent the surfaces of the eyepiece lens system 15. Surface No. 2 corresponds to the correction surface 34. Note that Table 1 shows the paraxial radius of curvature and aspherical surface coefficient of the rotationally symmetric aspherical surface which determines the shape of the correction surface 34.

TABLE 1

| Surface No. | R | D | Nd | ν |
|---|---|---|---|---|
| 1 | ∞ | 4.000 | 1.49176 | 57.4 |
| 2* | ∞ | 4.000 | — | — |
| 3 | 50.752 | 5.000 | 1.69680 | 55.5 |
| 4 | −21.400 | 25.500 | — | — |
| 5 | −7.700 | 5.800 | 1.84666 | 23.8 |
| 6 | 19.865 | 6.300 | 1.70154 | 41.2 |
| 7 | −13.250 | 0.600 | — | — |
| 8 | 57.346 | 3.600 | 1.77250 | 49.6 |
| 9 | −30.734 | 42.700 | — | — |
| 10 | 7.700 | 4.200 | 1.84666 | 23.8 |
| 11 | 6.564 | 15.350 | — | — |
| 12* | 20.902 | 6.000 | 1.49176 | 57.4 |
| 13 | −9.896 | — | — | — |

The symbol "*" designates a rotationally symmetric aspherical surface.

Aspherical Surface Data (Coefficients are zero (0.000) where not shown):

| Surface No. | k | A4 | A6 |
|---|---|---|---|
| 2 | 0.0000 | −0.1200 × 10⁻³ | — |
| 13 | −1.0000 | 0.6641 × 10⁻⁴ | 0.2858 × 10⁻⁷ |

Center Point of Correction Surface 34 (mm)

α=4.44
β=0.00

Figure 6A:
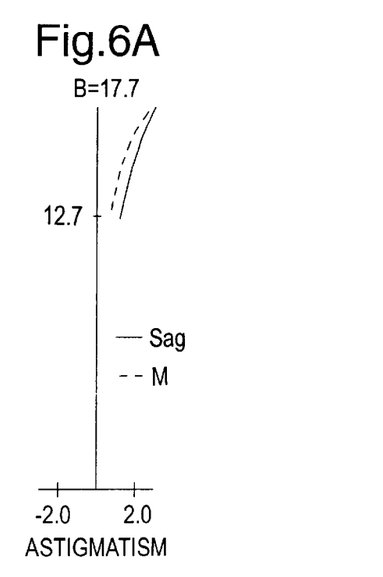
FIGS. 6A and 6B show aberration diagrams of a finder indication optical system according to the present invention.
Figure 6B:
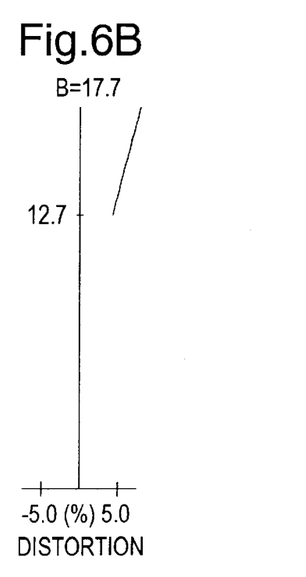

The various aberrations of the finder optical system 10 are shown in FIGS. 4A, 4B, 4C and 4D. The astigmatism and distortion of the finder indication optical system 30 and the finder optical system 10 are shown in FIGS. 6A and 6B.

The correction surface 34 is formed as a part of the rotationally symmetric aspherical surface whose axis of rotation is identical to the optical axis O of the finder optical system 10. According to recent technological advances, the grinding of the rotationally symmetric aspherical surface or the resin-molding of the rotationally symmetric aspherical surface can be relatively easily carried out. It is possible to cut and form the prism 33 having the correction surface 34 from an optical element having a rotationally symmetric aspherical surface 51 as an aberration conversion optical member having the correction surface 34.

The rotationally symmetric aspherical surface 51 defining the correction surface 34 satisfies the following condition:

$$|CY(y, z)|/|CZ(y, z)| = 2.98;$$

when y=α=4.44, z=β=0.

Namely, the embodiment satisfies condition (1). Note that $|CY(y, z)|$ and $|CZ(y, z)|$ can be determined by the following expressions (4) through (8).

The rotationally symmetric aspherical surface is represented by the following equation:

$$x = \frac{ch^2}{1 + \sqrt{1-(k+1)c^2h^2}} + \sum_{i=2}^{6} A_{2i}h^{2i} \qquad (4)$$

wherein variable "h" is equal to a distance ($h^2 = y^2 + z^2$) from the optical axis;

when equation (4) is differentiated by:

$$\frac{dx}{dy} = y\left\{\frac{c}{\sqrt{1-(k+1)c^2h^2}} + \sum_{i=2}^{6} 2iA_{2i}h^{2(i-1)}\right\} \qquad (5)$$

when equation (5) is differentiated by y:

$$\frac{d^2x}{dy^2} = \frac{c\{\sqrt{1-(k+1)c^2z^2}\}}{\{\sqrt{1-(k+1)c^2h^2}\}^3} + \sum_{i=2}^{6} 2iA_{2i}h^{2i-4}\{y^2(2i-1)+z^2\} \qquad (6)$$

when equation (4) is differentiated by z:

$$\frac{dx}{dz} = z\left\{\frac{c}{\left(\sqrt{1-(k+1)c^2h^2}\right)} + \sum_{i=2}^{6} 2iA_{2i}h^{2(i-1)}\right\} \qquad (7)$$

when equation (7) is differentiated by z:

$$\frac{d^2x}{dz^2} = \qquad (8)$$

$$\frac{c\{\sqrt{1-(k+1)c^2y^2}\}}{\{\sqrt{1-(k+1)c^2h^2}\}^3} + \sum_{i=2}^{6} 2iA_{2i}h^{2i-4}\{z^2(2i-1)+y^2\}$$

The absolute value of the curvature at an optional point (y, z) on the correction surface 34 can be obtained by substituting the equations (5) through (8) with:

$$|CY(y, z)| = \left|\frac{\frac{d^2x}{dy^2}}{\left\{1+\left(\frac{dx}{dy}\right)^2\right\}^{\frac{3}{2}}}\right|$$

$$|CZ(y, z)| = \left| \frac{\frac{d^2x}{dz^2}}{\left\{1 + \left(\frac{dx}{dz}\right)^2\right\}^{\frac{3}{2}}} \right|$$

In the present invention, the combined focal length of the optical system including the condenser lens 11, the relay lens system 13 and the eyepiece lens system 15 is fr=18.99; and the reduced spatial distance between the indication surface of the indicator 31 and the rotationally symmetric aspherical surface 51 is S=4.62. Consequently, S/fr=0.24. Hence, the embodiment satisfies the conditions (2) and (3).

As can be understood from the above discussion, according to the present invention, since the correction surface to correct the astigmatic difference is provided in the light path of the finder indication optical system, deterioration of the finder indication image is restricted, so that a high quality image of the finder indication can be obtained.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A finder indication optical system in which an indication device is provided in the vicinity of an image surface of an objective optical system or provided in a position in which the diopter is substantially equivalent to the image surface of the objective optical system when viewed through a finder field of view of a finder optical system, so that photographing information formed by the indication device can be viewed outside of the photographing area which is formed to be seen in the finder field of view, said indication optical system comprising:

a correction surface which is provided along a light path of the finder indication optical system to correct an astigmatic difference thereof, wherein the correction surface is provided at a predetermined position from the optical axis of the finder optical system as the origin point, and wherein the correction surface is formed in the following manner:

the optical axis defines an X-axis;

the direction parallel to the transverse direction of said correction surface and perpendicular to the X-axis, defines a Y-axis;

the direction parallel to the longitudinal direction of said correction surface and perpendicular to the X-axis, defines a Z-axis;

the coordinates of the center of said correction surface are ($\alpha,\beta$); and the absolute value of curvature C in a section parallel with a plane defined by said X-axis and said Z-axis, at the coordinates (y, z) of the correction surface, is $|Cz(y, Z)|$;

wherein said correction surface is formed so that the absolute value $|CZ(y, z)|$ of the curvature C increases as the absolute value of z at y=$\alpha$ increases.

2. The finder indication optical system according to claim 1, wherein the absolute value $|CY(Y, z)|$ of the curvature C in a section parallel with a plane defined by the X-axis and the Y-axis, at the coordinates (y, z) of the correction surface, satisfies the following condition (1) at y=$\alpha$ and z=$\beta$:

$$|CY(y, z)|/|CZ(y, z)| \geq 1 \tag{1}$$

3. The finder indication optical system according to claim 1, wherein the following condition (2) is satisfied:

$$S/fr < 0.5 \tag{2}$$

wherein fr designates the combined focal length of the optical system which constitutes the finder optical system provided optically behind the correction surface; and S designates the reduced spatial distance between a indication surface of the indication device and the correction surface.

4. The finder indication optical system according to claim 3, wherein the following condition (3) is satisfied:

$$0.1 < S/fr \tag{3}$$

5. The finder indication optical system according to claim 3, wherein said finder indication optical system comprises a prism, wherein the correction surface is formed on at least one of an incidence surface, a reflection surface and an emission surface, of the prism.

6. The finder indication optical system according to claim 2, wherein said correction surface is defined by a part of a rotationally symmetric aspherical surface whose rotational axis is to the same as the optical axis of the finder optical system.

7. The finder indication optical system according to claim 5, wherein said finder indication optical system comprises a real-image finder in which an object image formed by a photographing lens on a primary imaging plane is formed on a secondary imaging plane and viewed, through a condenser lens, a relay lens system, and an eyepiece lens system.

8. The finder indication optical system according to claim 7, wherein the indication device comprises an indicator which is located in the vicinity of the primary imaging plane and outside of the light path of the finder optical system, so that an indication surface of the indicator is located at a position optically equivalent to the primary imaging plane, wherein said prism is provided between the primary imaging plane and said condenser lens, and in the vicinity of the primary imaging plane.

9. The finder indication optical system according to claim 1, wherein the correction surface is positioned to transmit only light to be received by the finder indication optical system.

* * * * *